United States Patent
Schildt et al.

(10) Patent No.: US 11,837,914 B2
(45) Date of Patent: Dec. 5, 2023

(54) ELECTRIC DRIVE SYSTEM

(71) Applicant: Rolls-Royce Deutschland Ltd & Co KG, Blankenfelde-Mahlow (DE)

(72) Inventors: Philipp Schildt, Strullendorf (DE); Markus Sons, Nuremberg (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 0 days.

(21) Appl. No.: 17/730,164

(22) Filed: Apr. 26, 2022

(65) Prior Publication Data
US 2022/0344968 A1    Oct. 27, 2022

(30) Foreign Application Priority Data

Apr. 27, 2021 (DE) ............ 10 2021 110 774.1

(51) Int. Cl.
*H02J 9/06* (2006.01)
*H02J 7/00* (2006.01)
*B64D 27/24* (2006.01)

(52) U.S. Cl.
CPC ............ *H02J 9/062* (2013.01); *H02J 7/0013* (2013.01); *H02J 7/0024* (2013.01);
(Continued)

(58) Field of Classification Search
CPC .... H02J 7/0024; H02J 7/0063; H02J 2310/48; H02J 7/0025; H02J 7/0013;
(Continued)

(56) References Cited

U.S. PATENT DOCUMENTS

| | | | |
|---|---|---|---|
| 2009/0218989 A1* | 9/2009 | Davis ............... | H01M 10/4207 320/136 |
| 2011/0084704 A1* | 4/2011 | Myoen ................ | H02H 9/001 324/538 |

(Continued)

FOREIGN PATENT DOCUMENTS

| | | |
|---|---|---|
| CN | 201808464 U | 4/2011 |
| CN | 102910082 A | 2/2013 |

(Continued)

OTHER PUBLICATIONS

German Search Report for Germany Application No. 10 2021 110 774.1 dated Nov. 8, 2021.

*Primary Examiner* — Ryan Johnson
(74) *Attorney, Agent, or Firm* — Lempia Summerfield Katz LLC

(57) ABSTRACT

An electric drive system includes at least one electric drive unit. The at least one electric drive unit includes an electric motor and inverters that are each supplied with DC voltage via a high-voltage bus. The electric drive system includes a main battery system that has a plurality of battery modules that supply DC voltage to each of the high-voltage buses. The electric device system includes a plurality of reserve batteries. A separate reserve battery is provided for each high-voltage bus. The drive system is configured to make a change to the supply of DC voltage when a corresponding control signal is present for each of the high-voltage buses. A change is made from a supply of DC voltage of the battery module of the main battery system that is assigned to the high-voltage bus to a supply of DC voltage of the reserve battery assigned to the high-voltage bus.

18 Claims, 4 Drawing Sheets

(52) U.S. Cl.
CPC .......... *H02J 7/0025* (2020.01); *H02J 7/0063* (2013.01); *B64D 27/24* (2013.01); *B64D 2221/00* (2013.01); *H02J 2207/20* (2020.01); *H02J 2310/44* (2020.01)

(58) Field of Classification Search
CPC .... H02J 2310/44; B60L 50/64; B60L 3/0046; B60L 58/20; B60L 58/21; B60L 58/18; B60L 2200/10; B60L 2200/32; B64D 27/24; B64D 2221/00; Y02T 10/70; B64U 50/19
See application file for complete search history.

(56) References Cited

U.S. PATENT DOCUMENTS

| | | | | |
|---|---|---|---|---|
| 2013/0241472 | A1* | 9/2013 | Feuerstack | H02J 7/1492 |
| | | | | 320/107 |
| 2018/0339781 | A1 | 11/2018 | Vander Lind et al. | |
| 2020/0339010 | A1 | 10/2020 | Villanueva et al. | |
| 2022/0029431 | A1* | 1/2022 | McLean | B60L 50/66 |

FOREIGN PATENT DOCUMENTS

| | | | |
|---|---|---|---|
| CN | 107554345 | A | 1/2018 |
| DE | 102010047019 | A1 | 4/2012 |
| DE | 102015215430 | A1 | 2/2017 |
| DE | 102015216097 | A1 | 3/2017 |
| DE | 112015004205 | T5 | 6/2017 |
| DE | 112014007057 | T5 | 8/2017 |
| DE | 102018201202 | A1 | 8/2019 |
| WO | 2019145777 | A1 | 8/2019 |

\* cited by examiner

ELECTRIC DRIVE SYSTEM

PRIORITY

This application claims the benefit of German Patent Application No. DE 10 2021 110 774.1, filed on Apr. 27, 2021, which is hereby incorporated by reference in its entirety.

BACKGROUND

The present embodiments relate to an electric drive system and to a method for supplying DC voltage to a high-voltage bus.

In an electric aircraft, it is known to use a plurality of batteries that supply electrical energy to one or more electric drive units. Each electric drive unit in this case includes an electric motor that typically drives a propeller. The batteries are coupled to the electric drive units using DC-DC converters that permit the powers provided by the various batteries to be divided as desired.

In electric drive systems (e.g., in those for electric aircraft), there is the need to carry sufficient reserve energy and to be able to provide the reserve energy when required.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an electric drive system and an associated method that make it possible to effectively provide reserve energy for operation are provided.

According to a first aspect, an electric drive system includes at least one electric drive unit that includes an electric motor and inverters that each convert an input-side DC voltage to an output-side AC voltage that is provided to the electric motor. In this case, the inverters are each supplied with DC voltage via a high-voltage bus. The drive system also includes a main battery system that has a plurality of battery modules. The battery modules are provided to supply DC voltage to each of the high-voltage buses.

The drive system also includes a plurality of reserve batteries. A separate reserve battery is provided for each high-voltage bus. The drive system is configured to make a change to the supply of DC voltage when a corresponding control signal is present for each of the high-voltage buses. A change is made from a supply of DC voltage of the battery module of the main battery system that is assigned to the high-voltage bus to a supply of DC voltage of the reserve battery assigned to the high-voltage bus. There is thus a change to the supply of DC voltage from the main battery system to the reserve battery.

The present embodiments are based on the concept of considering the individual high-voltage buses of the drive unit or of the main battery system separately (also referred to as a "multi-lane" approach) and to provide for each high-voltage bus or each "lane" a separate energy reserve in the form of a separate reserve battery. If the energy provided by the assigned battery module of the main battery system is no longer sufficient or there are other predefined criteria present, a control signal is generated and there is a change to the supply of DC voltage to the high-voltage bus in question from the main battery system to the reserve battery. Such a change may be made separately for each high-voltage bus when predefined criteria are present.

One advantage associated with the present embodiments is that there is the option to configure the reserve batteries specifically for use as reserve batteries and to optimize the reserve batteries for particular operating ranges, since the reserve batteries are not provided for normal operation and are available only as reserve.

Accordingly, one configuration makes provision for the reserve batteries to be configured at a higher energy density and a lower power density in comparison with the battery modules of the main battery system (e.g., where the gravimetric or volumetric energy density or power density may be considered). While the battery modules of the main battery system are configured to provide a maximum power in particular operating ranges (e.g., upon starting an aircraft) and accordingly require a high power density, the reserve batteries may be configured with a lower power density and a higher energy density. For example, when using the present embodiments in electric aircraft, it is sufficient to safely land an electric aircraft that is already in the air using the reserve batteries and to this end to provide a large remaining flight distance. For this reason, a high energy density but not a high power density is advantageous.

The reserve battery may be optimized with respect to a high energy density by suitably arranging the battery cells or by suitable cell type/battery type, as is known per se to a person skilled in the art.

Another configuration makes provision for the reserve batteries to be configured for a lower cycle lifetime in comparison with the battery modules of the main battery system. This permits optimizations with respect to other parameters of the reserve battery (e.g., with respect to weight and costs).

Within the context of the present embodiments, "battery" is used to refer both to primary batteries that are not rechargeable, and to secondary batteries (e.g., accumulators) that are rechargeable. In this case, configurations of the present embodiments make provision for primary batteries to be used to implement the reserve batteries, while secondary batteries are used to implement the main battery system. As an alternative, secondary batteries are also used to implement the reserve batteries.

The term "when a corresponding control signal is present" may be that a change is made to the supply of DC voltage to a high-voltage bus not randomly, but that it is the order of corresponding commands that are referred to as control signals. In this case, the term "when a corresponding control signal is present" is not to be understood as being that necessarily only one control signal is responsible for the change to the supply of DC voltage to a high-voltage bus. It may be a plurality of controls signals that are involved, which cause a change to the supply of DC voltage to a high-voltage bus at the same time or one after another.

One configuration of the present embodiments makes provision for the main battery system to be configured as a replaceable battery system while the reserve batteries are fixedly installed in the drive system. This makes it possible to replace the main battery system between various operating phases (e.g., after landing or before starting an electric aircraft while the reserve batteries may remain in the aircraft). This reduces the maintenance effort.

The control signal for changing the supply of DC voltage to a high-voltage bus may be generated internally or externally. A first configuration to this end makes provision for the drive system to be configured to make the change to the supply of DC voltage when an internal control signal provided by a control unit of the drive system is present. In this case, the control unit is configured to obtain information about the state of charge of the battery modules of the main battery system and to generate such a control signal taking into account the state of charge. For example, the control unit monitors the state of charge of a battery module and generates a control signal when the state of charge falls below a predetermined value.

A second configuration makes provision for the drive system to be configured to make the change to the supply of DC voltage when an external control signal generated by an operator is present. For example, such a control signal is generated by a man-machine interface by the pilot of an aircraft in which the drive system according to the present embodiments is implemented. In this case, the control unit may provide information about the state of operation of the main battery system to the pilot that enable the pilot to make a decision.

Another configuration of the present embodiments makes provision for the battery modules of the main battery system and the reserve batteries each to be connected to the high-voltage buses without DC-DC converters. In this case, the DC voltage on the high-voltage buses is determined directly by the voltage of the respectively assigned battery modules of the battery system or of the respectively assigned reserve battery. A configuration of the drive system without DC-DC converters saves considerable costs and also achieves a reduction in weight.

In this case, one configuration makes provision for a change to the voltage supply by the reserve battery when a control signal is present to take place such that: the current at the high-voltage bus on which the change of the supply of DC voltage is intended to take place is initially set to zero; the high-voltage bus in question is subsequently disconnected from the main battery system; the voltage on the high-voltage bus is adapted to the voltage of the reserve battery to be connected; and the high-voltage bus is connected to the reserve battery.

Instead of using DC-DC converters, the energy supply is changed from the main battery to the reserve battery by suitable switching of the battery contacts.

Setting the current at the high-voltage bus on which the change of the supply of DC voltage is intended to take place to zero may be effected via a torque of zero being requested at the inverter that is supplied with voltage via the high-voltage bus in question. As a result, the following act (e.g., the disconnection of the high-voltage bus in question from the main battery system) may take place without load.

One configuration in this respect makes provision for the drive system to also be configured to: increase the power provided by the inverters that are connected to the other high-voltage buses when the current at the high-voltage bus is set to zero; and reduce the power provided by the inverters that are connected to the other high-voltage buses again when the high-voltage bus is connected to the reserve battery. This is done such that the power provided overall to the electric motor remains unchanged in each case.

Such a change to the voltage supply may be made in this case consecutively for all of the high-voltage buses, with the power of the electric motor being kept constant and not being impaired by the switching sequence in question.

The individual acts are triggered, for example, in each case by corresponding control signals of the control unit. In other words, the control unit is provided and adapted to: generate control signals that cause an inverter to request a torque of zero, and as a result, set the current at the assigned high-voltage bus to zero; disconnect the high-voltage bus from the main battery system; initiate measures that the voltage on the high-voltage bus is adapted to the voltage of the reserve battery to be connected; connect the high-voltage bus to the reserve battery; and step up the power provided by the inverters and decrease the power again.

In order to adapt the voltage on the high-voltage bus to the voltage of the reserve battery to be connected, one configuration of the present embodiments makes provision for the drive system to include a precharging circuit that is provided and configured to charge the voltage in an intermediate circuit capacitor of the inverter using a precharging contactor and a precharging resistor with a time constant to the voltage of the reserve battery before the voltage of the reserve battery is connected to the high-voltage bus and thus to the intermediate circuit capacitor using a main contactor. Adapting the voltages prevents current peaks during switchover. The precharging circuit is assigned to the reserve battery.

In order to adapt the voltage on the high-voltage bus to the voltage of the reserve battery to be connected, an alternative configuration makes provision for the drive system to be configured to provide a partly generator operation of the electric motor and to use the energy generated in the generator operation to charge an intermediate circuit capacitor of the inverter before the voltage of the reserve battery is connected to the high-voltage bus. This configuration makes it possible to avoid a separate precharging circuit. Instead, for the high-voltage bus in question, the intermediate circuit capacitor is charged by generator operation.

The aforementioned configurations provide implementations of the present embodiments without DC-DC converters. However, it is not compulsory to omit DC-DC converters. Other configurations of the present embodiments provide DC-DC converters between the individual battery modules of the main battery system and the respective high-voltage buses as well as between the reserve batteries and the respective high-voltage buses. DC-DC converters make it possible to provide a targeted, possibly combined, energy output to the high-voltage buses, with such an energy output being controlled, for example, by a control unit of the drive system.

In another aspect of the present embodiments, a method for supplying DC voltage of a reserve battery to a high-voltage bus that, in an electric drive system, supplies DC voltage to an inverter is provided. The inverter together with further inverters drives an electric motor of a drive unit of the drive system. The method includes: setting the current on the high-voltage bus to zero disconnecting the high-voltage bus from the main battery system; adapting the voltage on the high-voltage bus to the voltage of the reserve battery; and connecting the high-voltage bus to the reserve battery.

In this way, the supply of DC voltage is changed from a supply of DC voltage of a battery module of the main battery system to a supply of DC voltage of the reserve battery.

One configuration includes the further acts of: increasing a power provided by the other inverters when the current on the high-voltage bus is set to zero so that the power provided overall at the electric motor remains unchanged; and reducing the power provided by other inverters when the high-voltage bus is connected to the reserve battery so that the power provided overall at the electric motor remains unchanged.

In this configuration, the power of the electric motor is not influenced by the change.

BRIEF DESCRIPTION OF THE DRAWINGS

The invention will be explained in more detail below on the basis of a plurality of exemplary embodiments with reference to the figures of the drawing. In the drawings.

DETAILED DESCRIPTION

Figure 1:
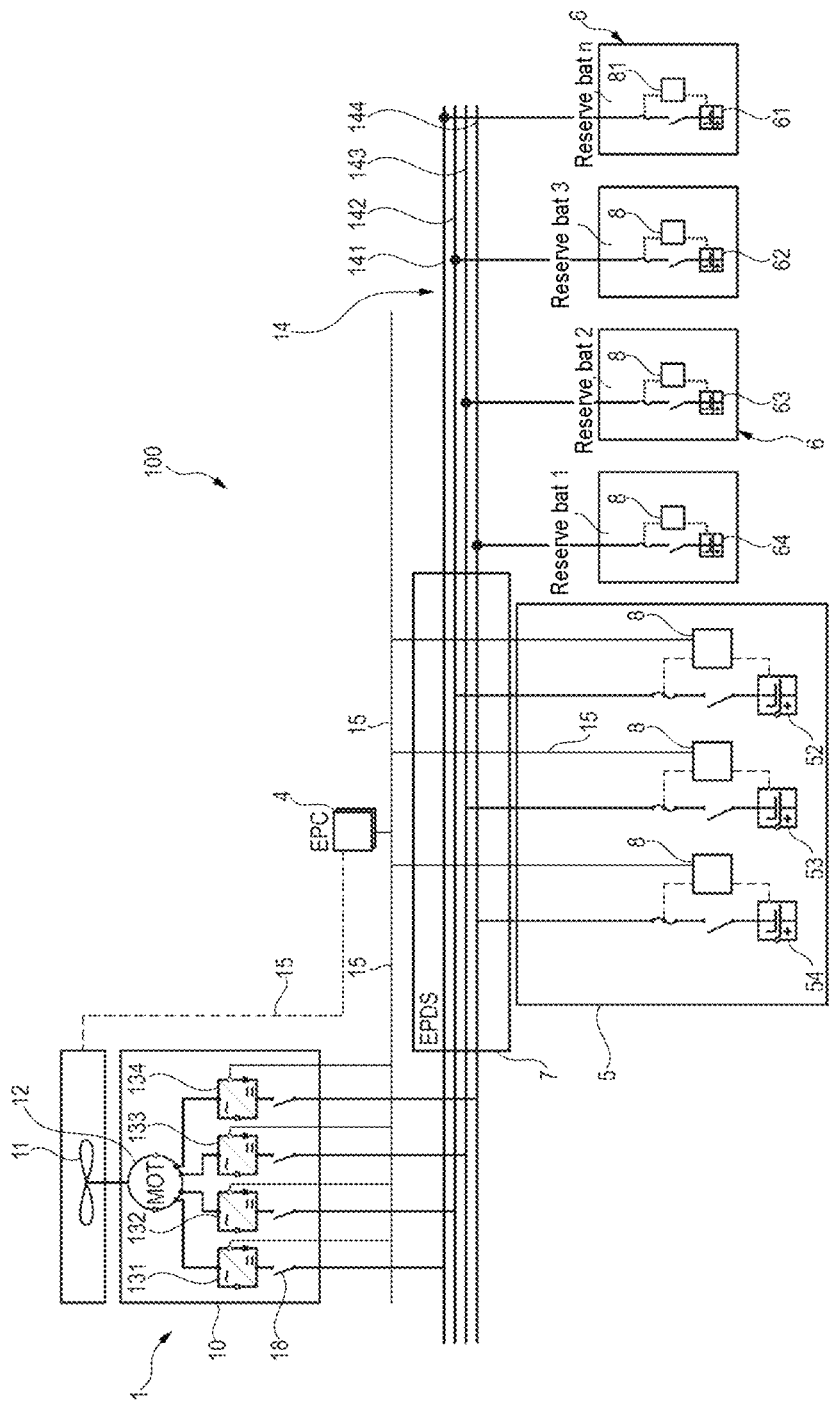
FIG. 1 shows a schematic illustration of an exemplary embodiment of an electric drive system for an electric aircraft that includes a main battery system and a plurality of reserve batteries that supply voltage to a plurality of high-voltage buses.

FIG. 1 schematically shows components of an electric drive system 100 for an electric aircraft. The electric drive system 100 has an electric aircraft drive 1 that consists of an electric drive unit 10 and a propeller 11 driven by the drive unit 10. The drive unit 10 in this case includes an electric motor 12 that is supplied with an alternating current via a plurality of inverters 131-134 (e.g., inverters or DC-AC converters). The electric motor 12 is, for example, a permanent-magnet synchronous motor that is supplied with 3-phase AC voltage by each of the inverters 131-134 in a known manner. The input side of the inverters 131-134 is connected via a bus system 14 to a main battery system 5 that supplies DC voltage to the inverters 131-134.

A switch 18 that makes it possible to connect and disconnect an inverter is assigned to each of the inverters 131-134. The switches 18 are in each case closed for the states described below.

FIG. 1 illustrates only an electric aircraft drive 1 with drive unit 10 and propeller 11. The electric drive system may have a number of such aircraft drives that are then likewise connected to the bus system 14.

The main battery system 5 includes a plurality of battery modules 52-54 that each consist of a plurality of battery cells that may store energy and output the energy again. The number of battery modules 52-54 that are combined to form the main battery system 5 depends on the number of aircraft drives 1. Each of the battery modules 52-54 is assigned a battery management system 8 that monitors the respective battery module 52-54 and, for example, transmits information about the state of charge or about the voltage and about the temperature to a control unit 4. The battery management system 8 may, in this case, disconnect the associated battery module from the bus system 14 using a switch.

The main battery system 5 may be configured overall so as to be replaceable so that maintenance may be carried out quickly after a flight.

The bus system 14 consists of a plurality of high-voltage buses 141-144. The individual high-voltage buses 141-144 are also referred to as "lanes". The inverters 131-134 are each supplied with DC voltage via an assigned high-voltage bus 141-144. The illustrated number of four high-voltage buses 141-144 is to be understood here as purely exemplary. In general, there are n high-voltage buses, with the input side of each of the inverters of the aircraft drives 1 being supplied with DC voltage by an assigned high-voltage bus.

The battery modules 52-54 of the main battery system 5 are coupled to the high-voltage buses 141-144 of the bus system 14 in a coupling module 7, which may be configured as a multicontact plug and couples the battery modules 52-54 to the individual high-voltage buses 141-144. In this case, provision is made for the number of battery modules 52-54 to correspond to the number of high-voltage buses 141-144 (e.g., each high-voltage bus 141-144 is assigned a battery module 52-54). FIG. 1 in this case does not illustrate all of the battery modules of the main battery system 5, with the battery module assigned to the high-voltage bus 141 not being illustrated.

The electric drive system 100 also includes a plurality of reserve batteries 61-64 that are each arranged in a reserve module 6 that additionally likewise has a battery management system 8. In this case, a separate reserve battery 61-64 is provided for each of the high-voltage buses 141-144.

The control unit 4 provides the central control logic of the electric drive system 100. The central control logic is connected via a control bus 15 to the individual inverters 131-134, to the propeller 11, to the battery management systems 8 in the main battery system 5, and also to the battery management systems 8 of the individual reserve modules 6 (not illustrated separately). The control unit 4 controls the rotational speed and/or power of the electric motor 12 and the propeller angle of the propeller 11 in a manner known per se. The control unit 4 also controls the supply of a DC voltage on the high-voltage buses 141-144 either using the main battery system 5 or using the reserve batteries 61-64. The latter is explained more below.

Provision is thus made, when a corresponding control signal of the control unit 4 is present or when an external control signal that is triggered, for example, by a pilot is present, for the supply of DC voltage to the high-voltage buses 141-144 to be changed such that there is a change from a supply by the main battery system 5 to a supply by the reserve batteries 61-64. In this case, provision is made for such a change to be able to be carried out separately for each high-voltage bus 141-144. In the text that follows, for example, the high-voltage bus 141 is considered as an example for the high-voltage buses 141-144.

The starting state is in this case the high-voltage bus 144 being supplied with direct current by one of the battery modules of the main battery system 5 (e.g., the battery module 54). In this case, this direct current is applied to one of the inverters (e.g., the inverter 134) by the high-voltage bus 144. When the battery management system 8 assigned to the battery module 54 determines that the state of charge of the battery module 54 falls below a predetermined value (e.g., the voltage provided by the battery module 54 falls below a predetermined value), this information is communicated to the control unit 4. This consequently causes a change to the voltage supply for the high-voltage bus 144. To this end, there is a change from a supply of DC voltage by the battery module 54 to a supply of DC voltage by the reserve battery 54.

Figure 5:
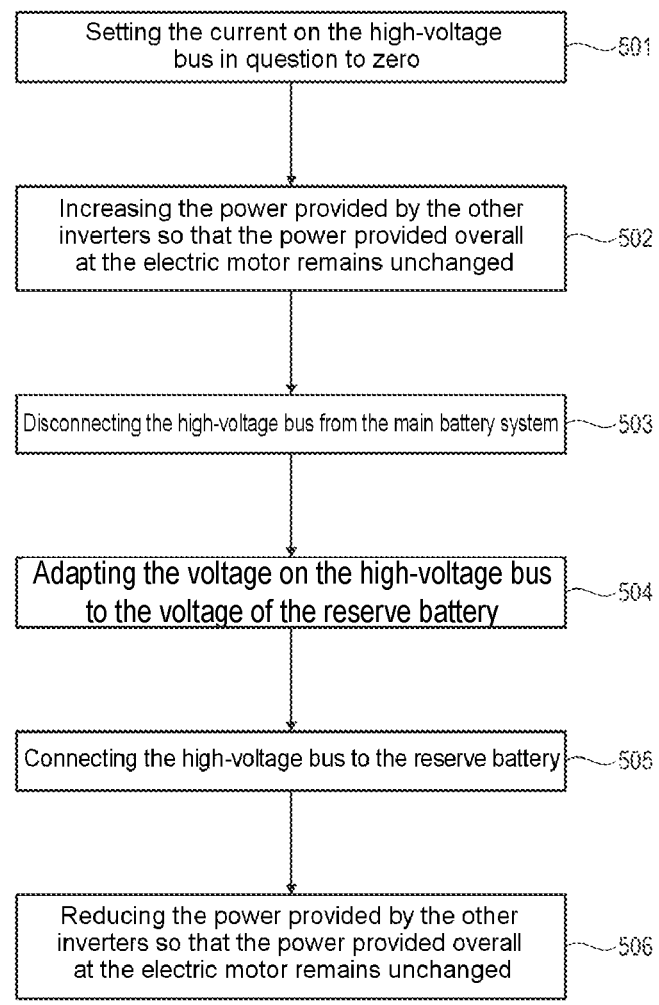
FIG. 5 shows a flowchart of a method for supplying DC voltage of a reserve battery to a high-voltage bus in a drive system according to FIG. 1.

FIG. 5 shows, by way of example, a flowchart of such a change. According to act 501, the current on the high-voltage bus 144 in question is set to zero. This takes place via the control unit 4 controlling the inverter 134 so that the control unit 4 requests a torque of zero. The switching elements of the inverter 134 then do not switch, and no current flows. Since the setting of the current to zero would lead to a power drop at the electric motor 12, according to act 502, the power provided by the other inverters 131-133 is increased at the same time or with a short time delay so that the electric motor 12 is operated overall with an unchanged power.

Subsequently, according to act 503, the high-voltage bus 144 is disconnected from the main battery system 5 (e.g., from the assigned battery module 54). This is done, for example, by the assigned battery management system 8 in response to a control signal of the control unit 4. After the high-voltage bus 144 has been disconnected from the main battery system 5, according to act 505, the high-voltage bus 141 may be connected to the reserve battery 64 assigned to the high-voltage bus 141. In order to prevent the occurrence of current peaks when connecting the reserve battery 64, the voltage on the high-voltage bus 144 is adapted to the voltage of the reserve battery 64 beforehand in act 504. Exemplary embodiments in this respect are described based on FIGS. 2 and 3.

Since now, too great a power would be provided for the electric motor 12 after renewed provision of DC voltage on the high-voltage bus 144 and the resumption of the operation of the inverter 134; in act 506, the power provided by the other inverters 131-134 and increased in act 502 is reduced again to the initial value so that a power provided overall at the electric motor 12 continues to remain unchanged.

In general, it holds true that the control unit 4 includes, for example, a processor and a non-volatile storage medium in which computer programs are stored. The computer programs, when executed by the processor, prompt the control unit 4 to generate control signals that control the described measures by taking into account input signals that the control unit 4 receives.

The change described based on FIG. 5 is made without the use of DC-DC converters. Instead, the DC voltage is connected directly to the individual high-voltage buses 141-144. According to act 504 of FIG. 5, the voltages are to be adjusted before connecting the high-voltage bus 141-144 to the reserve battery 61-64. In this case, the inverters 31-34 are each assigned an intermediate circuit capacitor that couples the respective inverter to the voltage on the high-voltage bus that, in the case in question, is now provided by the reserve battery according to act 505.

Figure 3:
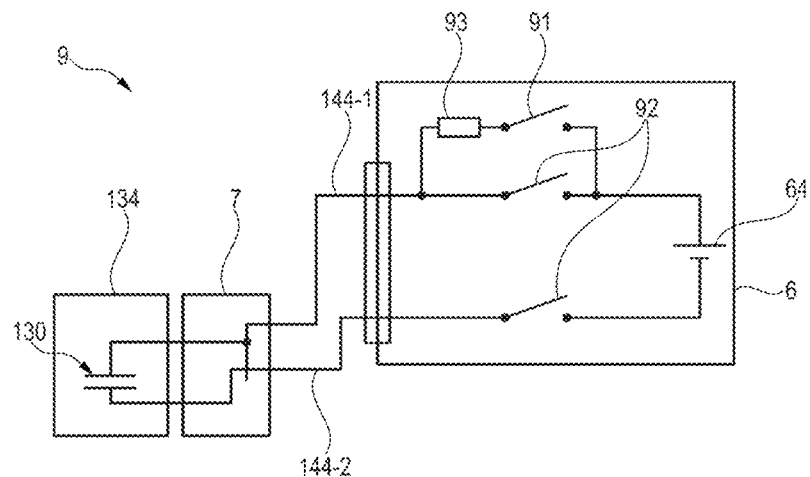
FIG. 3 shows an exemplary embodiment of a precharging circuit for adapting the voltage on a high-voltage bus to the voltage of a reserve battery.

FIG. 3 shows an exemplary embodiment in which the voltage on the high-voltage bus 144 is adjusted by a precharging circuit 9 to the voltage of the reserve battery to be connected. In this respect, FIG. 3 schematically shows a battery module 6 with a reserve battery 64. According to the description of FIG. 1, the reserve battery 64 is connected to one inverter 134 by the coupling module 7. In order to provide a DC voltage, two lines 144-1, 144-2 are provided, which together form the high-voltage bus 144. The two lines 144-1, 144-2 are connected to the positive pole and the negative pole of the reserve battery 64. At the same time, the two lines 144-1, 144-2 are connected to the positive pole and the negative pole of an intermediate circuit capacitor 130 that is assigned to the inverter 134.

The precharging circuit 9 is provided for a slow adaptation of the voltage of the intermediate circuit capacitor 130 to the voltage of the reserve battery 64. This precharging circuit includes a precharging contactor 91 and a precharging resistor 93 connected in series therewith. Two main contactors 92 are provided in parallel therewith. Before the main contactors 92 are closed, the precharging contactor 91 is closed so that the intermediate circuit capacitor 130 slowly charges using the precharging resistor 93. Since the intermediate circuit capacitor 130 has a low internal resistance, current peaks are thereby prevented when the reserve battery 64 is connected.

Figure 2:
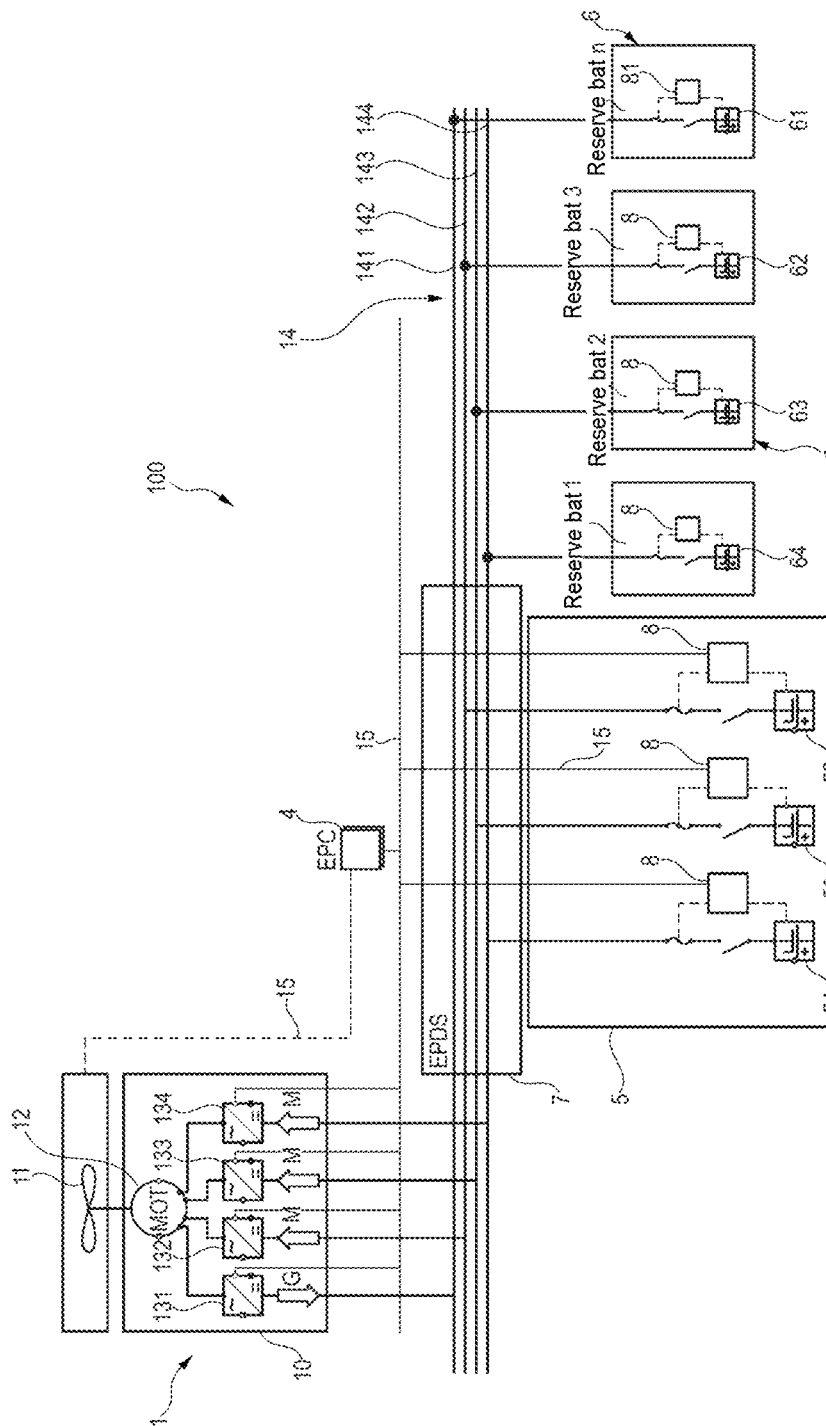
FIG. 2 shows an electric drive system of FIG. 1, with a generator operation being implemented on a high-voltage bus in order to adjust the voltage on the high-voltage bus to the voltage of a reserve battery.

The use of a precharging circuit 9 may be dispensed with when the intermediate circuit capacitor 130 is charged in a generator operation before the high-voltage bus is connected to the reserve battery. A state of this kind is shown in FIG. 2, which otherwise corresponds to FIG. 1. The inverters 132-134 are operated in motor operation (arrow M) and drive the electric motor 12. In contrast, the inverter 131 is operated in generator operation (arrow G), with a portion of the electric motor being operated by generator. Accordingly, a flow of energy in the direction of the high-voltage bus 141 is provided, which is used to charge the intermediate circuit capacitor 130.

The intermediate circuit capacitor 130 of the respective inverter 131-134 in question may therefore be charged to a desired capacitance, before a reserve battery 61-64 is connected, using generator and possibly motor operation of the inverter 131-134, at the high-voltage bus 141-144 of which a change in the supply of DC voltage is intended to take place.

Figure 4:
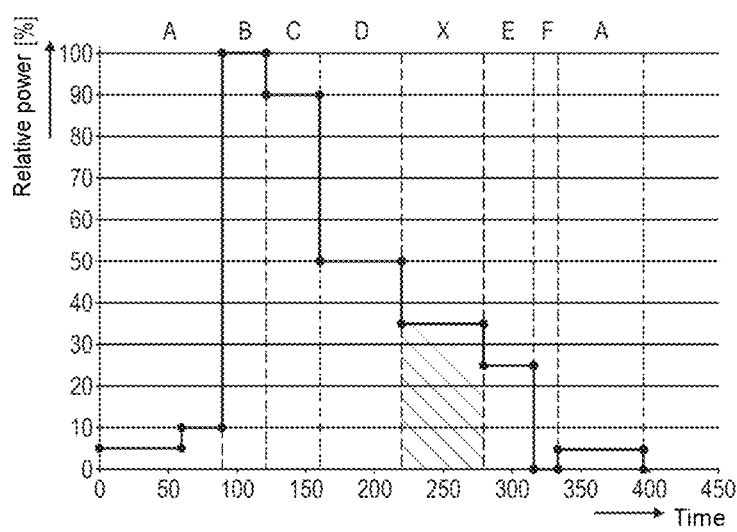
FIG. 4 shows a power consumed by an electric drive unit in typical phases of a flight of an electric aircraft.

The reserve batteries 61-64 of the electric drive system 100 may be optimized for an intended operating state and application. In comparison to the battery modules 51-53 of the main battery system 5, the reserve batteries are in this case configured, for example, for a higher energy density and a lower power density. This is illustrated based on the graph of FIG. 4 in which the y-axis illustrates the relative power of an electric motor 12 in percent at different flight phases of an electric aircraft.

In ground operation (flight phase A), the power is minimal. Upon starting B, the power increases to a maximum (100%) and slowly decreases in the ascent phase C. The flight phase D denotes cruising flight. In this case, the relative power is still only 50%. During descent (flight phase E), the power decreases to approximately 25%. After landing, the power in the taxi phase F is equal to zero before the power slightly increases again in ground operation A.

The power X provided by the reserve batteries is in this case in the power range between the descent phase E and cruising flight D. The reserve batteries are therefore optimized for a relatively low power density that is significantly below the power density that the main battery system 5 is to provide for the start and the ascent. The reserve batteries are in this case optimized so that, due to a high energy density, the reserve batteries are capable of still being able to fly the electric aircraft over as long a distance as possible in the event of a failure of the main power supply.

In this case, provision may be made for the reserve batteries to be fixedly installed in the aircraft.

The invention is not limited to the embodiments described above, and various modifications and improvements may be made without departing from the concepts described herein. Any of the features described may be used separately or in combination with any other features, to the extent that the features are not mutually exclusive. The disclosure extends to and includes all combinations and sub-combinations of one or a plurality of features that are described here. If ranges are defined, the ranges thus include all of the values within the ranges as well as all of the partial ranges that lie in a range.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. An electric drive system comprising:
   at least one electric drive unit that comprises an electric motor and inverters, each of the inverters configured to convert an input-side DC voltage to an output-side AC voltage that is provided to the electric motor, wherein the inverters are each supplied with DC voltage via a high-voltage bus;
   a main battery system comprising a plurality of battery modules, wherein the plurality of battery modules are configured to supply DC voltage to each of the high-voltage buses;
   a plurality of reserve batteries, wherein a separate reserve battery of the plurality of reserve batteries is provided for each high-voltage bus,
   wherein the electric drive system is configured to make a change to the supply of DC voltage when a corresponding control signal is present for each of the high-voltage buses,
   wherein the change is made from the supply of the DC voltage of a battery module of the plurality of battery modules of the main battery system that is assigned to the respective high-voltage bus to a supply of DC voltage of a reserve battery of the plurality of reserve batteries, assigned to the respective high-voltage bus.

2. The electric drive system of claim 1, wherein the plurality of reserve batteries are configured for a higher energy density and a lower power density in comparison with the plurality of battery modules of the main battery system.

3. The electric drive system of claim 1, wherein the plurality of reserve batteries are configured for a lower cycle lifetime in comparison with the plurality of battery modules of the main battery system.

4. The electric drive system of claim 1, wherein the main battery system is configured as a replaceable battery system.

5. The electric drive system of claim 1, wherein the plurality of reserve batteries are fixedly installed in the electric drive system.

6. The electric drive system of claim 1, wherein the electric drive system is configured to make the change to the supply of the DC voltage when an internal control signal provided by a control unit of the electric drive system is present, and
   wherein the control unit is configured to obtain information about a state of charge of the plurality of battery modules of the main battery system, and to generate such a control signal taking into account the state of charge.

7. The electric drive system of claim 1, wherein the electric drive system is configured to make the change to the supply of the DC voltage when an external control signal generated by an operator is present.

8. The electric drive system of claim 1, wherein the plurality of battery modules of the main battery system and the plurality of reserve batteries are each connected to the high-voltage buses without DC-DC converters.

9. The electric drive system of claim 8, wherein, when a control signal for changing the supply of DC voltage is present, the electric drive system is configured to:
   set a current at the respective high-voltage bus on which the change of the supply of DC voltage is intended to take place to zero;
   disconnect the respective high-voltage bus from the main battery system;
   adapt a voltage on the respective high-voltage bus to a voltage of the respective reserve battery to be connected; and
   connect the respective high-voltage bus to the respective reserve battery.

10. The electric drive system of claim 9, wherein the electric drive system is further configured to:
    increase a power provided by the inverters that are connected to the other high-voltage buses when the current at the respective high-voltage bus is set to zero; and
    reduce the power provided by the inverters that are connected to the other high-voltage buses again when the respective high-voltage bus is connected to the respective reserve battery such that a power provided overall to the electric motor remains unchanged in each case.

11. The electric drive system of claim 9, wherein the electric drive system is configured to set the current at the respective high-voltage bus, disconnect the respective high-voltage bus from the main battery system, adapt the voltage on the respective high-voltage bus, and connect the respective high-voltage bus for each of the high-voltage buses of the electric drive system consecutively.

12. The electric drive system of claim 9, wherein, in order to adapt the voltage on the respective high-voltage bus to the voltage of the respective reserve battery to be connected, the electric drive system comprises a precharging circuit that is provided and configured to charge a voltage in an intermediate circuit capacitor of the respective inverter using a precharging contactor and a precharging resistor with a time constant to the voltage of the respective reserve battery before the voltage of the respective reserve battery is connected to the respective high-voltage bus using a main contactor.

13. The electric drive system of claim 9, wherein, in order to adapt the voltage on the respective high-voltage bus to the voltage of the respective reserve battery to be connected, the electric drive system is configured to:
    provide a partly generator operation of the electric motor; and
    use energy generated in the generator operation to charge an intermediate circuit capacitor of the inverter assigned to the respective high-voltage bus in question before the voltage of the respective reserve battery is connected to the respective high-voltage bus.

14. A method for supplying DC voltage of a reserve battery of a plurality of reserve batteries of an electric drive system to a high-voltage bus of a plurality of high-voltage busses of the electric drive system, the high-voltage bus being configured, in the electric drive system, to supply DC voltage to an inverter, wherein the inverter together with further inverters are configured to drive an electric motor of a drive unit of the electric drive system, and wherein a separate reserve battery of the plurality of reserve batteries is provided for each high-voltage bus of the plurality of high-voltage busses, the method comprising:
    setting a current on the high-voltage bus to zero;

disconnecting the high-voltage bus from a main battery system;

adapting a voltage on the high-voltage bus to a voltage of the reserve battery; and connecting the high-voltage bus to the reserve battery.

15. The method of claim 14, further comprising:

increasing a power provided by other inverters when the current on the high-voltage bus is set to zero so that a power provided overall at the electric motor remains unchanged; and reducing the power provided by the other inverters when the high-voltage bus is connected to the reserve battery so that the power provided overall at the electric motor remains unchanged.

16. The method of claim 14, wherein adapting the voltage on the high-voltage bus to the voltage of the reserve battery comprises charging, by a precharging circuit, the voltage in an intermediate circuit capacitor of the inverter using a precharging contactor and a precharging resistor with a time constant to the voltage of the reserve battery before the voltage of the reserve battery is connected to the high-voltage bus by a main contactor.

17. The method of claim 14, wherein adapting the voltage on the high-voltage bus to the voltage of the reserve battery comprises:

providing a partly generator operation of the electric motor; and charging an intermediate circuit capacitor of the inverter using the energy generated in the generator operation before the voltage of the reserve battery is connected to the high-voltage bus.

18. A method for supplying DC voltage of a reserve battery to a high-voltage bus that, in an electric drive system, supplies DC voltage to an inverter, wherein the inverter together with further inverters drive an electric motor of a drive unit of the electric drive system, the method comprising:

setting a current on the high-voltage bus to zero;

increasing a power provided by other inverters when the current on the high-voltage bus is set to zero so that a power provided overall at the electric motor remains unchanged;

disconnecting the high-voltage bus from a main battery system;

adapting a voltage on the high-voltage bus to a voltage of the reserve battery; and connecting the high-voltage bus to the reserve battery.

* * * * *